United States Patent
Altmann

(10) Patent No.: US 7,122,075 B2
(45) Date of Patent: Oct. 17, 2006

(54) DEVICE FOR REDUCING THE GAS AND WATER CONTAMINATION OF TRANSFORMER OIL FILLING

(76) Inventor: Josef Altmann, Machova 142, 334 01, Domazlice (CZ)

( * ) Notice: Subject to any disclaimer, the term of this patent is extended or adjusted under 35 U.S.C. 154(b) by 193 days.

(21) Appl. No.: 10/485,057

(22) PCT Filed: Jul. 23, 2002

(86) PCT No.: PCT/CZ02/00044

§ 371 (c)(1), (2), (4) Date: Jan. 23, 2004

(87) PCT Pub. No.: WO03/011422

PCT Pub. Date: Feb. 13, 2003

(65) Prior Publication Data

US 2004/0216613 A1    Nov. 4, 2004

(30) Foreign Application Priority Data

Jul. 23, 2001    (CZ) .................................. 2001-2669

(51) Int. Cl.
*B01D 19/00* (2006.01)
(52) U.S. Cl. ................... 96/173; 96/201; 174/11 R
(58) Field of Classification Search ............... 96/173, 96/155, 201, 193; 174/11 R
See application file for complete search history.

(56) References Cited

U.S. PATENT DOCUMENTS

| 2,639,308 | A | * | 5/1953 | Egger ..................... 174/11 R |
| 2,639,309 | A | * | 5/1953 | Egger ..................... 174/11 R |
| 2,990,443 | A | * | 6/1961 | Camilli .................. 174/15.1 |
| 3,934,453 | A | * | 1/1976 | Hessen ..................... 73/19.11 |
| 4,561,866 | A | * | 12/1985 | Altmann et al. ............... 96/159 |
| 4,680,091 | A | * | 7/1987 | Altmann et al. ............. 202/205 |
| 5,900,538 | A | | 5/1999 | Bastian |
| 5,976,226 | A | | 11/1999 | Bastian et al. |

FOREIGN PATENT DOCUMENTS

FR    1229973 A  *  9/1960
JP    03078216 A  *  4/1991

OTHER PUBLICATIONS

Abstract; DD 147 978 A (Borowski, K.; Broedner, G.; Zuerich, W.) Apr. 29, 1981.*
Railway Technical Web Pages—Electric Traction Glossary regarding Bucholz Relay; updated Feb. 1, 2001.

* cited by examiner

*Primary Examiner*—Duane Smith
*Assistant Examiner*—Douglas J. Theisen
(74) *Attorney, Agent, or Firm*—Hovey Williams LLP

(57) ABSTRACT

The device for reducing the gas and water contamination of transformer oil filling includes a main tank and a conservator provided with a sludge discharge fitting, being joined by an upper connecting pipe having an upper Buchholz relay and a discharge fitting. A lower pipe coupling including a circulating pump joins a top part of the main tank with a top part of an oil cooler while a bottom part of the cooler is joined by a lower pipe coupling with the bottom part of the main tank. The main tank bottom part is provided with a release fitting and also has a connection led out from the release fitting, and is joined with the top part of a stabilizing tank, the bottom part of which is joined by a connection pipe with the sludge discharge fitting and/or with a fitting located in the conservator bottom part.

7 Claims, 2 Drawing Sheets

DEVICE FOR REDUCING THE GAS AND WATER CONTAMINATION OF TRANSFORMER OIL FILLING

BACKGROUND OF THE INVENTION

1. Field of the Invention

The invention relates to a device for reducing the gas and water contamination of transformer oil fillings which is especially suitable for reducing air gas and air humidity contamination of power transformers oil fillings.

2. Description of the Related Art

The existing solutions for reducing the gas and water contamination of fluids can be distinguished according to the principles they utilize on the one hand, or the degree of protection which these solutions give to protected fluids on the other hand.

One of the examples well known from engineering practice is the protection of power transformer oil fillings against air gas and humidity infiltration from the surrounding atmosphere.

The most frequently used devices are limited to only reducing the air humidity infiltration into the transformer oil filling by using air dryers. The dryers, operating either on an absorption or a freezing principle, are usually inserted into the pipeline joining a dialation vessel (conservator) with surrounding atmosphere.

Another substantially more effective solution which is able not only to limit the air humidity infiltration, but also air gas infiltration into a protected oil filling, operates on the principle of an elastic element, which is usually a bag or a diaphragm built directly in a conservator, where by means of said element, the protected fluid is separated from the surrounding air.

A further solution consists in reducing the air and humidity infiltration into the main tank by a so called thermo-hydraulic closure which is embedded either directly in a conservator or in a pipeline connecting the top part of the main tank with the bottom part of a conservator. In this case, a so called thermal stratifying layer is utilized which arises in a thermo-hydraulic closure vessel and separates cold and potentially contaminated oil from the conservator from the hot oil in the main tank. Under suitable conditions this layer acts as a very thin and perfectly elastic diaphragm protecting the proper transformer oil filling against the infiltration of undesirable admixtures from the surroundings.

Another relatively new solution, which can strongly reduce the air gas and humidity infiltration into the oil filling of power transformers, utilizes a dissimilar hydraulic connection between the conservator and the main tank. The connection of the transformer bottom part with the conservator enables the exploitation of the thermal stratifying layer which spontaneously arises in the transformer bottom part of the main tank for a natural separation of the hot and clean oil which occurs in a top part of this machine from the air gas contaminated cold oil which occurs in the conservator.

All solutions given here and devices based thereupon have some disadvantages.

A fundamental disadvantage of all devices which merely suppress or reduce the air humidity infiltration into the transformer is they only affect the water contamination of the transformer and thereby the instant (short-term) reliability thereof. More particularly, these solutions do not limit the undesired penetration of gas, above all oxygen, into the transformer and are not able to suppress the oxidation aging both of the proper oil and of solid insulants which mainly affect the long-term reliability of this machine.

However, one fact to be considered as a main disadvantage of the so called transformer hermetization by means of a bag or diaphragm, built in a conservator, is that this solution is relatively expensive and routinely needs a tightness check of the elastic element in working conditions. When some leakage appears, this element cannot be simply repaired and usually the whole conservator must be replaced.

In a case where the thermo-hydraulic closure is used, some disadvantages of the elastic element do not occur because the thermal stratifying layer arises always spontaneously on a hot and cold oil boundary line and cannot be permanently damaged. But to stabilize this layer, a sufficient thermal difference must be maintained in a thermohydraulic closure vessel and—in order to cover the whole extent of transformer working temperatures—the thermo-hydraulic closure vessel must be sufficiently voluminous. All these facts complicate both the transformer design (usually so called transport profile thereof must be enlarged), and an eventual modification thereof to a hermetized version, and further additional devices are necessary which complicate the maintenance. For example, the thermal stratifying level must be stabilized by drawing out the oil from the closure.

A main disadvantage of the thermal stratifying level utilization in the bottom part of a main tank consists in a potential stability violation of this layer, partly by heat transfer from the machine magnetic circuit anchored at the vessel bottom and partly by a turbulent oil stream from the coolers. This is due to relatively high vessel entering velocity of the turbulent oil stream which may start the stratifying layer to first undulate or even be destroyed afterwards.

SUMMARY OF THE INVENTION

The above mentioned disadvantages are substantially restricted by means of the device for reducing the gas and water contamination of fluids consisting of a main tank and a conservator which is provided with a sludge discharge fitting. These are mutually joined by an upper connecting pipe in which a Buchholz relay and a discharge fitting are built. The main tank top part is joined with the oil cooler top part by an upper pipe coupling in which a circulating pump is built. The oil cooler bottom part is joined by a lower pipe coupling with the bottom part of the main tank which is also provided with a release fitting.

The essence of the invention consists in that the main tank is joined, through the release fitting, by a connection with the top part of the stabilizing tank, the bottom part of which is joined by a connecting pipe with a sludge discharge fitting and/or with a fitting located in the conservator bottom part.

In alternative solutions, a de-aerating pipe is led out of the main tank top part, behind the Buchholz relay, and inserted into the conservator upper part. The discharge fitting is closed and the release fitting as well as the sludge discharge fitting are open.

A lower Buchholz relay is built in the highest part of the main-tank-stabilizing-tank connection tube and a sludge discharge cock is built in the lowest part of the stabilizing-tank-conservator connecting pipe.

An upper temperature sensor, joined by an upper signal line with a temperature controller, is built in the stabilizing tank upper part. Further a lower temperature sensor, joined by a lower signal line with a temperature controller, is built in a stabilizing tank bottom part.

The advantage of the device according to the invention consists above all in the fact that the clean and hot fluid in a main vessel, heated by a thermal source, is separated by a stable thermal stratifying layer, which arises spontaneously in an external, so called stabilizing tank, from cold and potentially contaminated fluid from the conservator. At the same time, the stratifying layer position and stability are controlled by transformer cooling.

The occurrence of thermal (density) stratifying layers in fluids is known in general and can often be observed partly in the nature. See e.g. the thermal inversion in atmosphere, the stratifying of warm and cold water layers in oceans and reservoirs having a dam, and partly in engineering (e.g. density stratifying in chemical as well as nuclear reactors etc.).

The influence of these layers is mostly held as negative phenomenon because these layers are very stable and obstruct the requested fluid mixing very effectively. On the contrary, in the device according to the inventions this phenomenon and its relatively high stability are utilized to reduce the undesirable admixture infiltrations into the protected fluid.

EXAMPLE OF THE INVENTION EMBODIMENT

Figure 1:
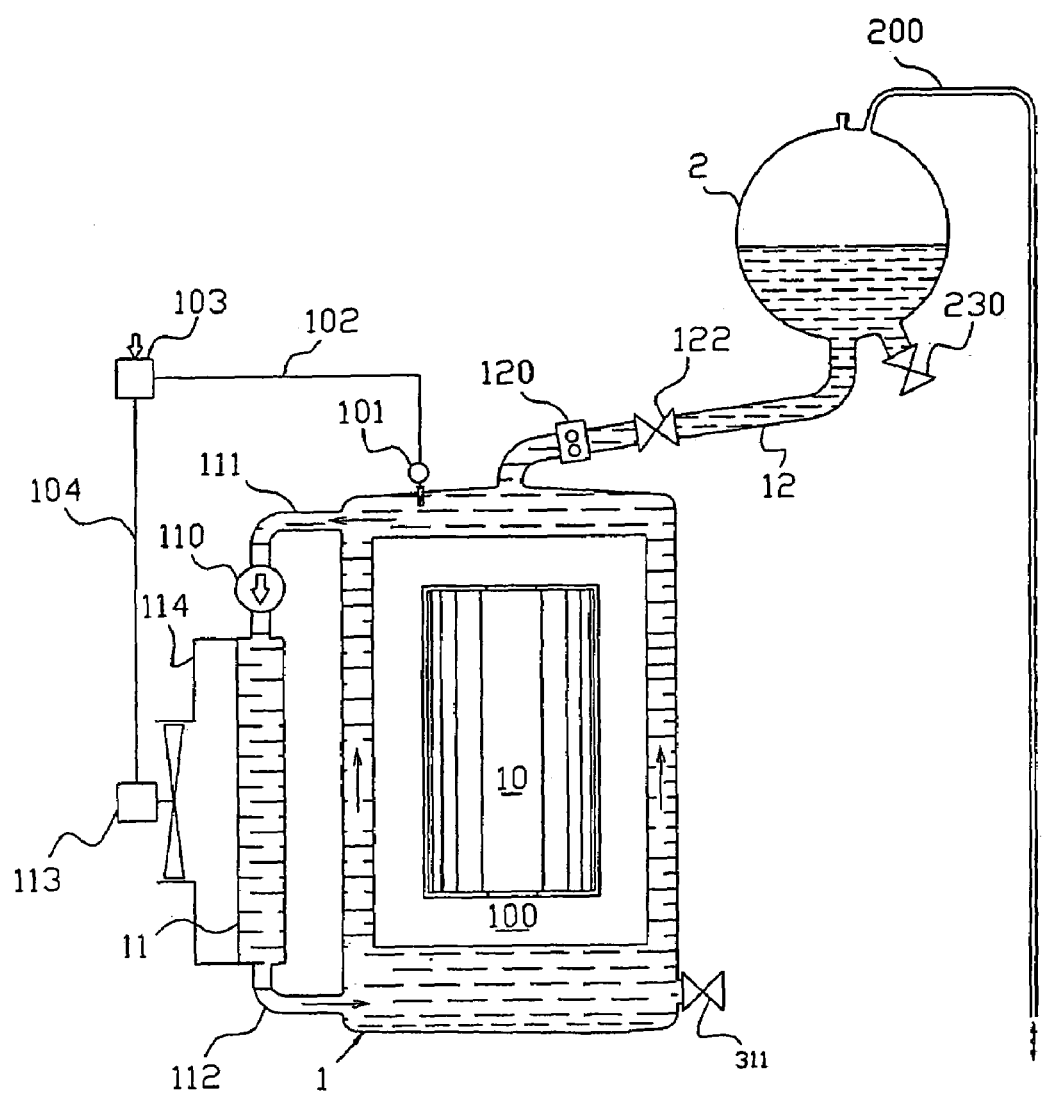
FIG. 1 shows a device for reducing the gas and water contamination in accordance with the prior art.
Figure 2:
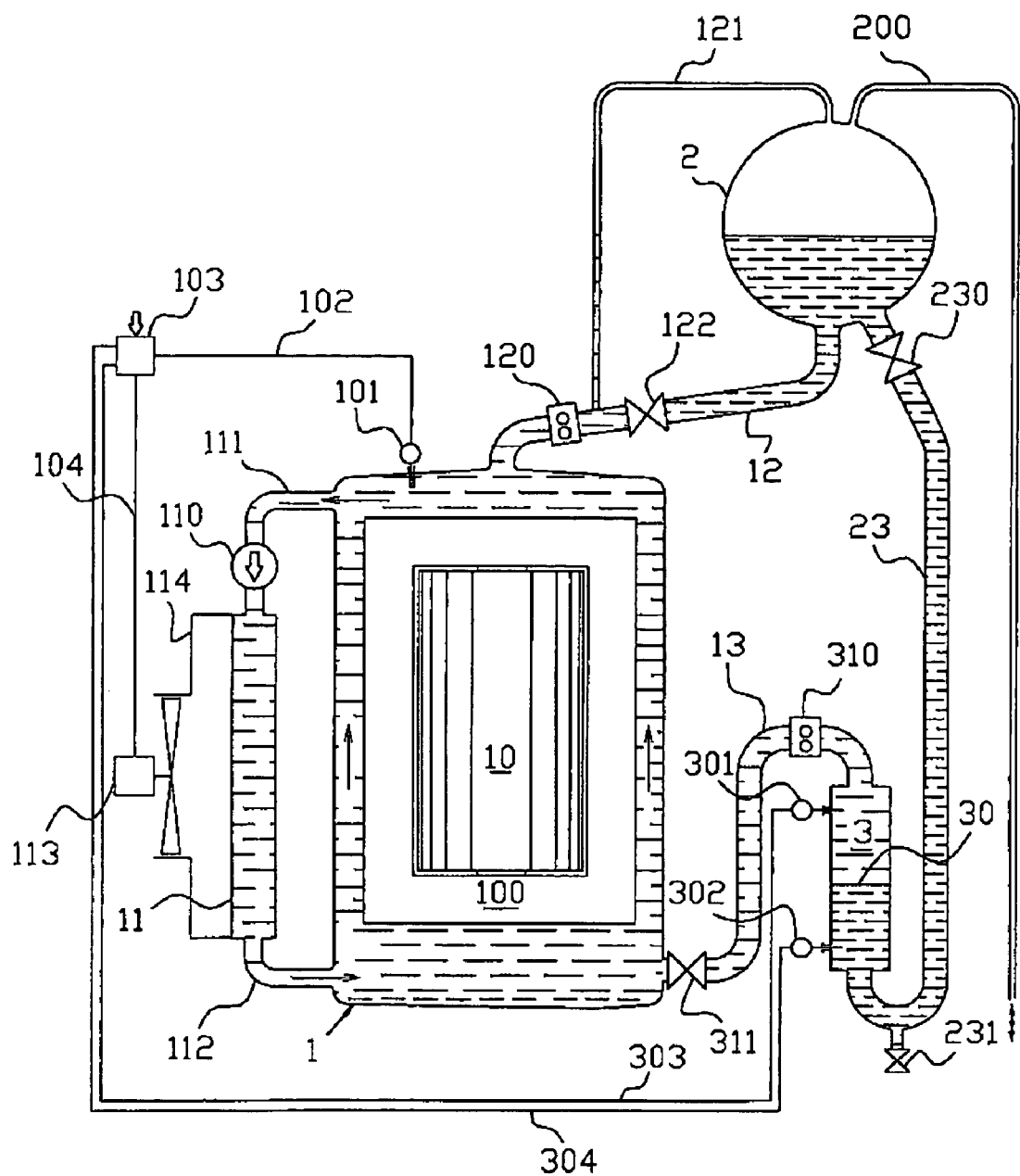
FIG. 2 illustrates the device in accordance with the present invention in which the proposed solution is presented.

On of the practical embodiments according to the invention is given on the attached drawing in FIG. 2 where the device in accordance with the invention is presented as a modification to the usual power transformer, the standard arrangement of which is shown in FIG. 1.

An example of the device arrangement in accordance with the invention conforming to FIG. 2 primarily includes a main tank 1, and a conservator 2 located above the main tank 1 and the stratification or stabilizing tank 3. In part, the lower part of the conservator 2 is joined with a lower part of said stabilizing tank 3 by means of a lower connecting pipe 23. An upper part of the stabilizing tank is joined by a connection 13 for conveying hot oil with a lower part of the main tank 1 of a transformer. The lower part of the conservator 2 is in part joined with the upper part of the main tank 1 by an upper connection pipe 12 where the upper Buchholz relay 120 and the discharge fitting or cut-off valve 122 are situated, and also a part of the upper part of the conservator 2 is also joined with the connection pipe 12 by a de-aerating pipe 121 and with the surrounding atmosphere by an equalizing pipe 200.

A magnetic circuit 100 is provided with a winding 10 and is built in the main tank 1, whereby an upper pipe coupling or upper sleeve 111, with built in circulating pump 110 is led out from the left upper side of the main tank 1 and is inserted into the upper part of an oil cooler 11 to which a fan box 114, with a built in fan 113, is firmly attached. Also a lower pipe coupling 112 which is connected to a lower part of the oil cooler or radiator 11, is led out from the left lower part of the main tank 1.

A lower connecting pipe 23 through which cold oil from the bottom of the stabilizing tank 3 passes is joined to a discharge fitting or sludge valve 230 of the conservator 2 and is provided with a sludge discharge fitting or sludge cock 231 in its lowest part. The stratification or stabilizing tank 3 is provided with a lower temperature sensor 302 in its bottom third and with upper temperature sensor 301 in its top third. Then, in the highest part of the hot oil connection 13, the lower Buchholz relay 310 is firmly built and a lower part of the connection 13 is inserted into a discharge valve or release fitting 311 located in a lower part of the main tank 1.

The upper Buchholz relay 120 and the discharge fitting 122 are built in the upper connection pipe 12 in a standard way and the de-aerating pipe 121 leads from this pipeline behind the upper Buchholz relay 120. The de-aerating pipe 121 is disembogued into the upper part of the conservator 2. The discharge fitting 122 is shown in FIG. 2 as a cut-off valve haing at least an open and a closed position.

A control circuit is used to control the transformer oil temperature in a standard way. The control circuit includes a temperature sensor 101, built in a cover of the main tank 1 and connected by a signal line 102 with an input of a temperature governor or controller 103, the output of which is connected by a control line 104 with a fan 113. The temperature control circuit is extended in this example by two temperature values measured on the stratification or stabilizing tank 3, i.e. by means of an upper temperature sensor 301, situated in the upper part of the stratification tank 3, which is connected by an upper signal line 303 with the temperature governor or controller 103. The temperature control circuit is also extended by means of a lower temperature sensor 302 which is connected by a lower signal line 304 with the temperature governor or controller.

The operation of the device according to the invention can best be described by comparing the transport processes going on in the oil filling in a standard transformer as shown in FIG. 1, and in a transformer as shown in FIG. 2. By a comparison of both Figures it becomes obvious that the modification of a standard transformer arrangement in accordance with the invention, primarily consists of a suitable connection of the conservator bottom part with the main tank 1 bottom part by means of a lower connecting pipe in which a stabilisation or stratification tank is built on the one hand, and in connecting the upper connecting pipe to the conservator top part by a de-aerating pipeline on the other hand.

In both cases, the oil filling of the main tank 1 is heated by loss power of the magnetic circuit 100 and of the winding 10, and the heated oil is drawn through the upper pipe coupling or upper sleeve 111 into a circulating pump 110 and then driven into the oil cooler 11 where the oil is cooled by the air delivered by the fan 113. After cooling the oil is led through the lower pipe coupling or bottom sleeve 112 back into the main tank 1, where the oil bypasses and cools the magnetic circuit 100 and the winding 10 again and is led into the oil cooler or radiator once more.

In the standard transformer arrangement in FIG. 1, the main tank 1 and the conservator 2 are connected by the upper connecting pipe 12 whereby hot oil flows from the highest point of the main tank 1 and enters the lowest part of the conservator 2. In this case, the discharge fitting or cut-off valve 122 of the upper connecting pipe 12 is open, and of course the standard sludge discharge fitting or sludge valve 230 of the conservator and the standard release fitting or sludge cock 231 of the main tank are also closed.

During operation the oil is steadily heated in the main tank 1 by the loss power of both the magnetic circuit and the winding 10 and, at the same time, the oil in the conservator 2 is cooled by the atmospheric environment. Therefore the thermal difference between the main tank 1 and the conservator arises and as a result hot oil flows steadily, even under constant temperature, through the top cross section half of the upper connecting pipe 12 from the main tank into the conservator 2, where the oil is also saturated by atmospheric gas and possibly humidity. The same cooled oil volume simultaneously flows from the conservator 2 (under steady conditions) through the bottom cross section half of the upper connection pipe 12 back into the main tank 1. As a result the oil filling of this machine is contaminated.

The quasistationary contamination is further intensified by dynamic contamination or distillation. This is caused by transformer temperature change over time regardless of whether these changes are due to the machine load changing or control deviation of transformer cooling. A part of the hot oil is always transported out of the main tank into the conservator (where it is saturated with air gas and humidity again) due to the temperature increase by oil dilatation in the machine vessel. Also, as a result of the transformer oil temperature drop, the corresponding oil volume which has been contaminated in this way, is delivered back into the main tank.

The principal aim the device in accordance with the present invention is the suppression of the dynamic transport of contaminating substances from the environment into the protected fluid in the main tank.

As may be apparent by comparing FIGS. 1 and 2, this purpose is reached in the device according to the invention hereof chiefly due to the extensive suppression of the influence of both the thermosiphon phenomenon and the dynamic rinsing process between the main tank 1 and the conservator 2 in the transformer which has been modified and parametrically set in accordance with the present invention.

The thermosiphon phenomenon is suppressed simply by closing the discharge fitting or cut-off valve 122 in the upper connecting pipe 12. This enables free oil flow, necessary for the transformer oil filling dilatation, by opening a spare pipeline which is formed by simultaneously opening the sludge cock or sludge discharge fitting 230 of the conservator 2, to which the lower connecting pipe 23 is attached, and the release fitting 311 on the bottom part of the main tank 1. Of course, this spare pipeline, composed of the lower connection part 23 and the connection 13, is first filled with oil from the conservator 2 and vented by means of the lower Buchholz relay 310, with the oil content of the conservator being properly filled by oil.

Gas which may possibly escape from the main tank 1 is not affected by the device in compliance with the invention. This is because the gas, after having passed through the upper Buchholz relay 120, can flow freely through the de-aerating pipe 121 into the top part of the conservator 2 and escape freely into the surroundings through the equalizing pipe 200.

At the same time, the dynamic transport of contaminating substances from the conservator 2 into the main tank 1 is expressively limited by the influence of the stabilizing tank 3 which functions as a stratification tank in which the thermal stratifying layer 30 arising and persisting is effectively secured in a controlled way. By virtue of the stratifying layer 30, hot oil entering the stabilizing or stratification tank 3 through the connection 13 downwards from the main tank 1, is separated from cold contaminated oil which enters the stabilizing tank 3 upwards from the conservator 2 through the lower connecting part 23.

At the same time the thermal stratifying layer 30 stability and position are conditioned by by transformer thermal conditions which are controlled by means of the temperature controller 103. This thermal conditioning occurs both in a normally arranged transformer, as presented in FIG. 1, and in the transformaer arranged in accordance with the invention, see FIG. 2. With oil temperature rising in the top part of the main tank 1, this deviation is processed by the temperature sensor 101 to an electric signal which is led by a signal line 102 to the temperature controller 103 where it is compared to the requested temperature value T of the transformer. When the temperature of this transformer is greater than the desired temperature, the fan 113 is switched on by a control line 104 and starts to drive environmental air into the fan box 114.

The thermal energy transfer from a heat-exchanging surface of the oil cooler 11 into the air environment is intensified due to forced air passage through the oil cooler 11 and oil, passing through the cooler, is cooled. This process continues until the oil temperature drops by a previously chosen temperature difference $\Delta T$, the so called control process hysteresis, under the requested transformer temperature T.

Then the temperature controller 103 switches off the fan 113 and the transformer temperature increases again and the whole process is repeated.

When the transformer has been modified according to the present invention, this cyclic process is used advantageously to stabilize the thermal stratifying layer 30 in the stabilizing or stratification tank 3.

When the transformer temperature is rising and the oil volumne in the main tank 1 has adequately increased, a part of the hot oil flows through the connection 13 into the top part of the stratification or stabilizing tank 3. The thermal stratifying layer 30 then shifts downwards in this vessel, and cold oil from the bottom part of the stabilizing or stratification tank 3 flows through the lower connecting pipe 23 into the conservator 2.

When the thermal stratifying layer 30 shifts under the position of the lower temperature sensor 302, a signal, caused by the step temperature increase, is transmitted by the lower signal line 304 to the temperature controller 103. This produces the first modification of the hysteresis value $\Delta T$ in the controller 103 or governor and the temperature controller 103 switches on the fan 113. The transformer temperature then starts to decrease, the oil volume in the main tank 1 then drops, and the corresponding cold oil volume flows from the conservator 2 into the bottom part of the stratification or stabilizing tank 3 through the lower connecting pipe.

The thermal stratifying layer 30 moves upwards and when it passes the level of the upper temperature sensor 301, the signal, caused by a step drop of the measured temperature, is transferred by the upper signal line 303 to the temperature controller or governor 103. This signal produces the second modification of the hysteresis $\Delta T$ in this controller and a correction of the requested transformer temperature T. After these modifications of both parameters of the temperature controller 103 have been automatically set, it is warranted that the thermal stratifying layer 30 must move within the stratification or stabilizing tank 3 only under normal operating conditions, i.e. the so called hot oil penetration into the conservator 2 is eliminated as well as cold oil penetration into the main tank 1.

To efficiently separate the hot and cold oil by means of the thermal stratifying layer 30 in the stratification or stabilizing tank 3, the inevitable thermal difference must be held by which the thermal stratifying layer 30 is conditioned.

In the device in compliance with the invention this purpose is achieved in two ways, i.e. by the physical arrangement of the connection 13 and by dimensioning the stratification tank 3 and by adaptive control of requested transformer temperature T at the same time in a parametric way, and by its cyclic and accurately defined change.

A fundamental advantage of the device according to the invention consists in its simplicity which enables easy and inexpensive modification of even existing transformers which augments their instantaneous and long term reliability after those transformers have been subjected to radical atmospheric gas and humidity contamination which reduce the quality of their oil fillings.

A further advantage of the device in accordance with the invention is rooted in the fact that it makes use of power sources and equipment which are always available in a power transformer with forced cooling and oil circulation. Here, magnetic circuit and winding loss power is utilized as a thermal source necessary to create a thermal stratifying layer in the stabilizing tank which is also a stratification tank. At the same time, the existing forced fan transformer cooling is used to stabilize the position of the thermal stratifying layer in the stabilizing tank even at considerable temperature changes, e.g. due to transformer loading change.

A further advantage of the device in compliance with the invention chiefly includes that it does contain any mechanically movable parts which could be otherwise damaged in normal operation and should be tested or repaired.

Another advantage is also rooted in that by the device according to the invention, the operation of the normal transformer protection, i.e. the Buchholz relay, is not affected but the reliability, sensitivity and selectivity of this protection is augmented expressively by doubling this relay.

A further advantage of this device is that it provides maximal suppression of the rising of free water and other undesirable admixtures which originate in the conservator or in the transformer itself respectively and that it enables the separation and drainage of this water and the sludge from the lowest part of the connecting pipeline even during normal transformer operation.

LIST OF REFERENCE NUMBERS

1 main tank
10 winding
11 oil cooler or radiator
12 upper connecting pipe
13 connection
100 magnetic circuit
101 signal line
103 temperature controller or governor
104 control line
110 circulating pump
111 upper pipe coupling
112 lower pipe coupling
113 fan
114 fan box
120 upper Buchholz relay
121 de-aerating pipe
122 discharge fitting or cut-off valve
2 conservator
23 lower connecting pipe
230 sludge discharge fitting or sludge valve
201 sludge discharge cock or sludge cock
200 equalizing pipe
3 stabilizing tank
30 thermal stratifying layer
303 upper signal line
304 lower signal line
310 lower Buchholz relay
301 upper temperature sensor
302 lower temperature sensor
311 release fitting or discharge valve

What is claimed is:

1. A device for reducing the gas and water contamination of fluids comprising a main tank and a conservator fluidically connected to a sludge discharge fitting, said main tank and conservator being fluidically connected by an upper connecting pipe 12 having an upper Buchholz relay and a discharge fitting fluidically coupled therewith, said main tank including a top part which is connected to a top part of an oil cooler by an upper pipe coupling, the upper pipe coupling having a circulating pump operatively coupled therewith, the oil cooler including a bottom part which is connected with the bottom part of said main tank by a lower pipe coupling, the bottom part of said main tank also being provided with a release fitting wherein said bottom part of said main tank is fluidically connected by a connection, which is fluidically coupled with said release fitting, with a top part of a stabilizing tank, the bottom part of which is connected by a connecting pipe with at least one of said sludge discharge fitting and with a fitting located in the bottom part of said conservator.

2. The device according to claim 1, wherein a de-aerating pipe, fluidically coupled with the top part of said conservator, is led out from the top part of said main tank behind said Buchholz relay, whereby said discharge fitting which is fluidically coupled with said connecting pipe in a direction towards said conservator, is closed, and said release fitting, fluidically coupled with the bottom part of said main tank, and said sludge discharge fitting, which is fluidically connected to the bottom part of said conservator, are open.

3. The device according to claim 1, wherein a lower Buchholz relay is built in the highest part of said connection and a sludge discharge cock is built in the lowest part of said connecting pipe.

4. The device according to claim 1, wherein an upper temperature sensor, which is connected with an upper signal line and to a temperature controller, is built in the top part of said stabilizing tank.

5. The device according to claim 2, wherein a lower Buchholz relay is built in the highest part of said connection and a sludge discharge cock is built in the lowest part of said connecting pipe.

6. The device according to claim 2, wherein an upper temperature sensor, which is connected with an upper signal line and to a temperature controller, is built in the top part of said stabilizing tank.

7. The device according to claim 3, wherein an upper temperature sensor, which is connected with an upper signal line and to a temperature controller, is built in the top part of said stabilizing tank.

* * * * *